US008751042B2

(12) United States Patent
Lee et al.

(10) Patent No.: US 8,751,042 B2
(45) Date of Patent: Jun. 10, 2014

(54) METHODS OF ROBOT BEHAVIOR GENERATION AND ROBOTS UTILIZING THE SAME

(75) Inventors: Haeyeon Lee, Tokyo (JP); Yasuhiro Ota, Union, KY (US); Cynthia Breazeal, Cambridge, MA (US); Jun Ki Lee, Cambridge, MA (US)

(73) Assignees: Toyota Motor Engineering & Manufacturing North America, Inc., Erlanger, KY (US); Massachusetts Institute of Technology, Cambridge, MA (US)

( * ) Notice: Subject to any disclaimer, the term of this patent is extended or adjusted under 35 U.S.C. 154(b) by 358 days.

(21) Appl. No.: 13/325,598

(22) Filed: Dec. 14, 2011

(65) Prior Publication Data

US 2013/0158707 A1 Jun. 20, 2013

(51) Int. Cl.
*G05B 19/04* (2006.01)
*G06F 19/00* (2011.01)

(52) U.S. Cl.
USPC ........... 700/246; 700/245; 700/249; 700/257; 700/264

(58) Field of Classification Search
USPC ............................................... 700/245–264
See application file for complete search history.

(56) References Cited

U.S. PATENT DOCUMENTS

| 6,175,772 | B1 | 1/2001 | Kamiya et al. |
|---|---|---|---|
| 6,347,261 | B1 | 2/2002 | Sakaue et al. |
| 6,629,242 | B2 | 9/2003 | Kamiya et al. |
| 6,714,840 | B2 | 3/2004 | Sakaue et al. |
| 6,718,232 | B2 | 4/2004 | Fujita et al. |
| 6,850,818 | B2 | 2/2005 | Sabe et al. |
| 7,113,848 | B2 | 9/2006 | Hanson |
| 7,310,571 | B2 | 12/2007 | Kumazawa et al. |
| 2003/0060930 | A1 | 3/2003 | Fujita et al. |
| 2006/0129277 | A1 | 6/2006 | Wu et al. |
| 2007/0038331 | A1 | 2/2007 | Hanson |

FOREIGN PATENT DOCUMENTS

JP 3676969 B2 7/2005

*Primary Examiner* — Bhavesh V Amin
(74) *Attorney, Agent, or Firm* — Dinsmore & Shohl LLP

(57) ABSTRACT

A method of generating a behavior of a robot includes measuring input data associated with a plurality of user responses, applying an algorithm to the input data of the plurality of user responses to generate a plurality of user character classes, storing the plurality of user character classes in a database, classifying an individual user into a selected one of the plurality of user character classes by generating user preference data, selecting a robot behavior based on the selected user character class, and controlling the actions of the robot in accordance with the selected robot behavior during a user-robot interaction session. The selected user character class and the user preference data are based at least in part on input data associated with the individual user.

20 Claims, 4 Drawing Sheets

METHODS OF ROBOT BEHAVIOR GENERATION AND ROBOTS UTILIZING THE SAME

TECHNICAL FIELD

The present specification generally relates to human-robot interactions and relationships and, more specifically, to methods of generating robot behaviors for human-robot interactions.

BACKGROUND

Robots are increasingly being used in a wide variety of applications in which they interact with people. For example, robots may be programmed to interact with people during a human-robot interaction, which may be for entertaining, providing companionship, providing therapeutic communication, etc. In a symbiosis society between robots and humans, human-robot interaction may be important in fostering relationships between robots and people.

When one person meets another person for the first time, there may be a large variance on their behaviors when first building a relationship between each other. For example, people may feel a stress, strain or nervousness when interacting with a person for the first time. Other people may not feel stress but rather welcome the opportunity to meet someone new. In either case, people tend to change their behavior toward others after getting to know them over time. Similarly, people may have behavior variances when interacting with a particular robot for the first time, as well as change their behavior after having become accustomed to interacting with the robot over time. Therefore, it may be beneficial for the robot to be able to recognize the behavior and/or personality of the user such that it may behave in a manner that is pleasing to the particular user.

Accordingly, a need exists for alternative robots and methods that recognize a user's personality, and generates a robot behavior that is appropriate to the user's personality.

SUMMARY

In one embodiment, a method of generating a behavior of a robot includes measuring input data associated with a plurality of user responses, applying an algorithm to the input data of the plurality of user responses to generate a plurality of user character classes, storing the plurality of user character classes in a database, classifying an individual user into a selected one of the plurality of user character classes by generating a user preference data, selecting a robot behavior based on the selected user character class, and controlling the actions of the robot in accordance with the selected robot behavior during a user-robot interaction session. The user responses correspond to users of a user population. The selected user character class and the user preference data is based at least in part on input data associated with the individual user.

In another embodiment, a method of generating a behavior of a robot includes defining a plurality of user character classes that are stored in a database and are associated with personality types, measuring input data associated with a user response to an introduction scenario performed by the robot, applying a de-dimensional algorithm to the input data of the user response to generate a user character vector, and classifying an individual user into a selected one of the plurality of user character classes based at least in part on the user character vector and input data associated with the individual user. The method may further include selecting a robot behavior based on the selected user character class and selecting a user interaction scenario based at least in part on the selected robot behavior. The interaction scenario may instruct the robot to discuss particular conversation topics and perform particular movements associated with the selected user character class. The actions of the robot may be controlled in accordance with the selected robot behavior and user interaction scenario during one or more user-robot interaction sessions. The method may further include measuring input data associated with a user response to the one or more user-robot interaction sessions, and updating the user character vector, selected user character class, selected robot behavior, and user interaction scenario after each user-robot interaction session based on the input data measured during the previous user-robot interaction sessions.

In yet another embodiment, a robot includes an audio output for producing sounds corresponding with human speech such that the robot is capable of speaking to a user of the robot, an audio input for receiving speech of the user as the user interacts with the robot, a video input for detecting movements of the user as the user interacts with the robot, a processor for controlling actions of the robot, and one or more computer-readable memory devices including a database and a set of executable instructions capable of being read and executed by the processor. The instructions include a user character estimator module, a robot behavior generator module and an interaction performer module. The user character estimator module is programmed to receive input data from the audio input and the video input, wherein the input data corresponds with speech and movements of the user during an introduction scenario performed by the robot, apply a de-dimensional algorithm to the input data of the user response to generate a user character vector, classify the user into a selected one of a plurality of predefined user character classes based at least in part on the user character vector and input data associated with the individual user, wherein each user character class is associated with a personality type, and store the user character vector in the database. The robot behavior generator module is programmed to determine a robot behavior associated with the selected user character class. The interaction performer module is programmed to select a user interaction scenario based at least in part on the selected robot behavior. The processor executes the set of executable instructions to control the robot to discuss particular conversation topics via the audio output and perform particular movements associated with the selected robot behavior, the selected user interaction scenario, and the selected user character class.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the drawings, embodiments described herein improve interactions between robots and robot users. To build a strong human-robot relationship, the robot should understand the user's basic character as people do in everyday human-human relationships. Using data collected from many individual users, a plurality of user character classes are developed. The user character classes correspond with different personality types. For example, persons of one personality type may be very talkative, while persons of a different personality type may be quite and reserved. The robot may be programmed to perform an introduction scenario to a person that is interacting with the robot for the first time. In one embodiment, the robot measures input data corresponding to the user's reaction to the robot and the introduction scenario. The input data is then used to classify the user into a proper user character class. The robot then selects a robot behavior that is appropriate for the user character class such that it behaves in a manner that is pleasing to the user. The robot may continuously collect input data during subsequent interactions with the user such that the user may be reclassified into a different user character classes over time. Various embodiments of methods of robot behavior generation and robots utilizing such methods will be described in more detail herein.

Figure 1:
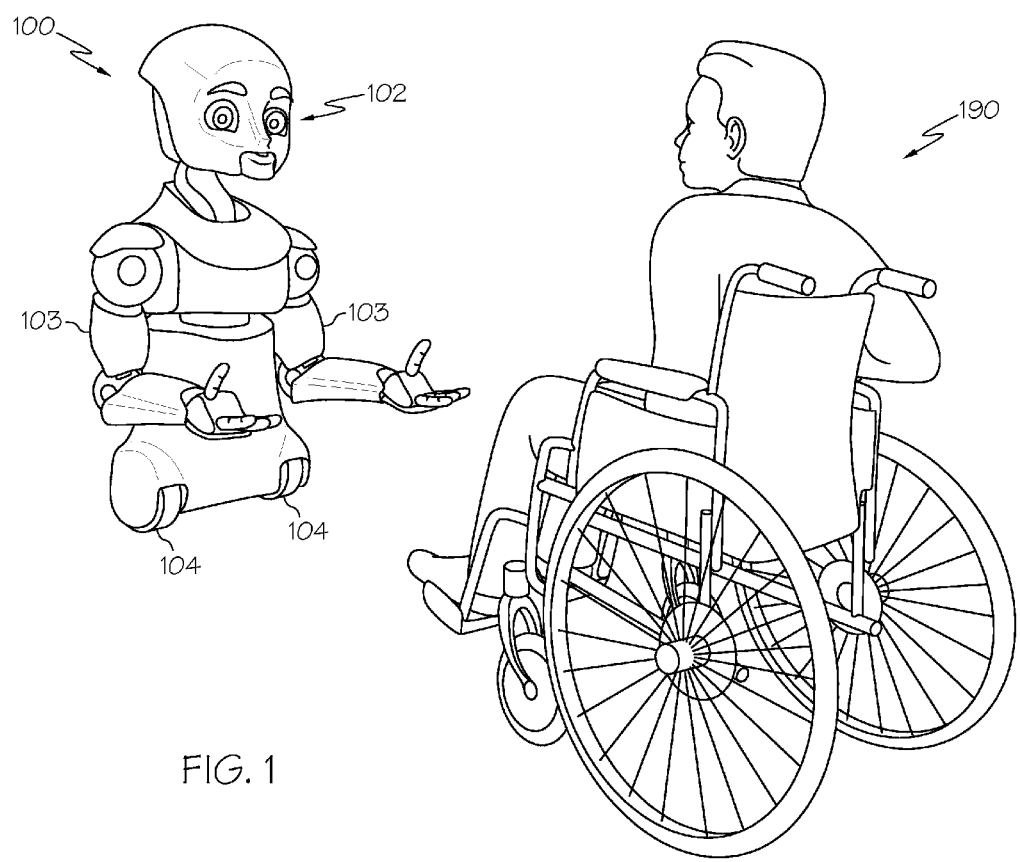
FIG. 1 depicts a schematic illustration of a robot and a user interacting with one another according to one or more embodiments shown and described herein.

Referring now to the figures, FIG. 1 depicts a robot 100 and a user 190 participating in a human-robot interaction. It should be understood that embodiments are not limited to the robot 100 as illustrated in FIG. 1, and that the robot 100 may take on many forms and sizes. For example, the robot may be a small table-top robot, a robot that is shape like an animal, a humanoid robot, etc. The robot may also be simulated, e.g., displayed by a display device such as a television. The user 190 may be any person using the robot. For example, the user 190 may be a patient residing in a healthcare facility, such as the user 190 illustrated in FIG. 1. As described in more detail herein, robots utilizing the robot behavior generating methods described herein may be used to treat and diagnose persons in need of healthcare services. For example, a robot may interact with residents of a long-term nursing care facility for the elderly to entertain the residents as well as communicate data back to healthcare personnel regarding the residents' emotional state.

As shown in FIG. 1, the robot may have appendages such as arms 103 that may be controlled so that the robot can make gestures to the user 190. The robot may also have mobility devices such as wheels 140 illustrated in FIG. 1. It should be understood that other mobility devices may be utilized, such as track devices or legs. The robot 100 of some embodiments may also be stationary without mobility devices. The illustrated robot 100 has ahead portion 102 that has humanoid features such as eyes and a mouth. In one embodiment, the robot 100 may be configured to smile and change the appearance of its face. For example, the robot 100 may frown or smile depending on the particular situation.

Figure 2:
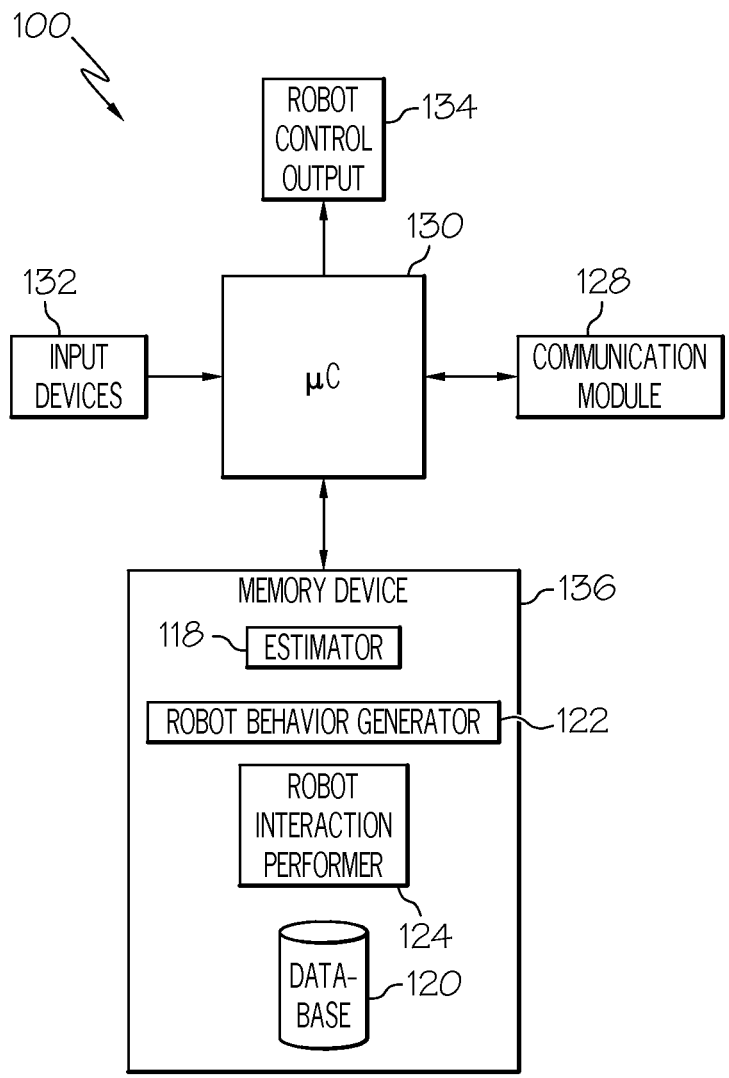
FIG. 2 depicts a schematic illustration of components of a robot according to one or more embodiments shown and described herein.

Referring now to FIG. 2, exemplary components of a robot of one embodiment is illustrated. More or fewer components may be utilized, depending on the capabilities of the robot. The robot 100 of the illustrated embodiment comprises a processor 130 that is communicatively coupled to a memory device 136. The processor 130 may be any processing device (or multiple processing devices) having the ability to read and execute computer readable and executable instructions stored on the memory device 136 and/or within the processor 130 itself. The processor 130 is electrically coupled to a robot control output 134 that controls the movements and speech of the robot. The robot control output 134 may comprise motors (e.g., servo motors) and associated drive electronics for controlling the movement of the robot, as well as electronics and speakers for the generation of speech and sounds that may be communicated to users of the robot.

The memory device 136 may comprise one or more devices capable of storing data, such as the data collected from the users during human-robot interactions, as well as software programs used to control the robot and implement the robot behavior generation methods described herein. The memory device 136 may comprise volatile memory devices (e.g., random access memory, dynamic random access memory, static random access memory, etc.) and non-volatile memory devices (e.g., flash memory devices, magnetic disk devices, optical disk devices, etc.). As illustrated in FIG. 2, the memory device 136 may store instructions for performing features and functionality of the robot generation methods described hereinbelow. A user character estimator module 118, a robot behavior generator module 122, an interaction performer module 124, and a database 120 for storing input data may be maintained on the memory device 136, which may be one or more memory devices and components. The processor 130 may read instructions stored on the memory device 136 as well as write data thereto.

One or more input devices 132 are also coupled to the processor. The input devices 132 are used to gather data relating to the users' responses to the robot during human-robot interactions. As described in detail below, the input data collected is used to classify the user into a user character class such that the robot may behave in a manner that is acceptable to the user. The input devices 132 may be any device that is capable of gathering the type of data that is used to classify the user. The input devices 132 may include, but are not limited to, a video camera for recording movements of the user, a microphone for recording the speech and sounds produced by the user, and a grasping device to detect a user's perspiration in the hands and/or gripping force. It should be understood that embodiments may utilize more or fewer input devices.

Still referring to FIG. 2, the processor 130 may be coupled to a communications module 128 that enables the robot 100 to communicate with external devices. For example, the communications module 128 may be configured as a wireless or wired network adaptor configured for two-way communication with one or more external devices. In one embodiment, the communications module 128 is a IEEE 802.11x wireless card that communicates with a wireless communications network to transmit and receive data related to the control of the robot 100, input data received from user responses, compiled data, reports, charts, etc. In this manner, personnel may remotely receive data from the robot 100 as well as remotely provide instructions to the robot 100 (e.g., a robot operator may remotely control the robot 100), and perform wireless software updates to the robot 100.

Figure 3:
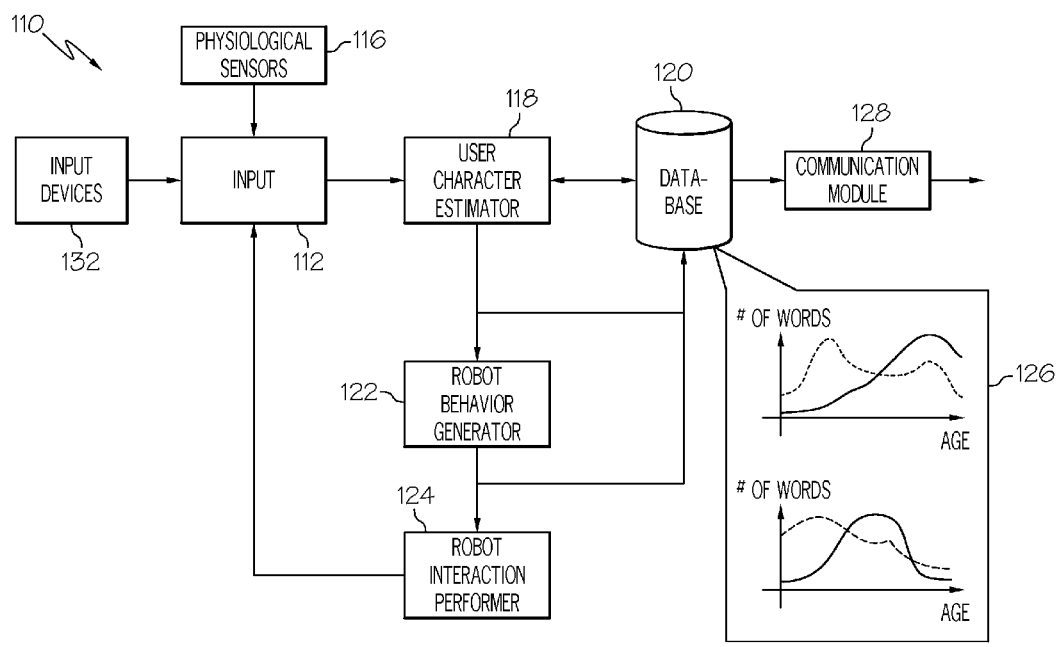
FIG. 3 depicts a schematic illustration of components of a robot for generating a robot behavior according to one or more embodiments shown and described herein.

Referring now to FIG. 3, embodiments generally develop a plurality of user character classes and place users within appropriate user character classes based on input data relating to users' response during human-robot interactions. The robot may then adapt its behavior based on a user character class that is associated with the user. In this manner, the robot may behave in a way that is not offensive or annoying to the user.

Initially, a plurality of user character classes may be generated. In one embodiment, the user character classes are generated by gathering input data associated with a plurality of users of a population. As an example and not a limitation, a sample group of two hundred people may be selected to interact with one or more robots. It should be understood that more or fewer people may be included in the sample group. Referring generally to blocks 112, 114 and 116, in one embodiment, each person (i.e., user) may experience an initial introduction scenario performed by the user. The introduction scenario may take a variety of forms. For example, the introduction scenario may comprise a plurality of questions that the robot asks the user while also performing particular motions. The introduction scenario may also be configured as a test conversation, or a game in which the user and robot participate. The same introduction scenario should be experienced by each individual user so that the results may be comparative to one another. Data may be gathered from interactions other than introduction scenarios.

The introduction scenario may also comprise gathering demographic parameter data about each of the users that interact with the robot. For example, parameters such as an age parameter, a gender parameter, cultural parameter (e.g., nationality, ethnicity), a family situation parameter (e.g., single, married, divorced, widowed, etc.), an educational background parameter, an interests parameter (e.g., sports, politics), etc, may be collected during the introduction scenario. The demographic parameter data may be used in conjunction with the input data to assist in both developing the user character classes as well as placing each user into the appropriate user character class. The demographic parameter data may be conveyed verbally by the user, or the robot may further comprise a user interface (e.g., touch screen, keyboard, or mouse, etc.) that the user may operate to input the demographic parameter data.

At block 112, the robot monitors the response of each user during the introduction scenario. Input data associated with a user's response may be received from block 114 using the input devices 132. For example, the robot may use a video camera and a microphone to receive data associated with the user's movements and speech during the introduction scenario. The input data that is gathered may include a plurality of user behavior vectors that are associated with particular responses made by the user during the introduction scenario (or subsequent human-robot interaction sessions, as described below). At block 116, if utilized, physiological data from physiological sensors may be provided to the robot 100. For example, a skin conductor may be used to provide data regarding perspiration on the user's hands, which may indicate nervousness.

Particular behaviors may be indicative of a person's personality because people tend to show their emotional status and underlying personality in non-verbal ways. Exemplary user behavior vectors may include, but are not limited to, a number of spoken words of the user during a human-robot interaction session (number of words vector), a number of words per minute, a number of emotional words spoken by the user (number of emotional words vector), a time the user spent smiling during the session (smiling time vector), amount that the user's face or head moves (face movement vector), the types of gestures made by the user (gesture vector), and duration of eye contact made with the robot (eye contact vector). Many other behavior vectors may also be utilized. These behavior vectors are collected as input data for each user that experiences the introduction scenario.

The input data collected at block 112 may be provided to a user character estimator module illustrated as block 118. The user character estimator module 118 may be software implemented and stored in the memory device 136. The user character estimator module 118 (or other software module) may organize the input data into a database 120 that stores the input data, as well as resulting user character class information. The database 120 may be composed based on the demographic parameter data described above. For example, the database may be organized based on age, gender, culture or family situation.

The input data collected at block 112 is highly-dimensional. The user character estimator module 118 applies an algorithm to map the highly-dimensional input data into less dimensional classes (e.g., a de-dimensional algorithm). The reduced classes may be designated as the user character classes. Exemplary de-dimensional algorithms may include self-organizing maps (SOM) and support vector machines (SVM). These algorithms allow for the mapping of data even when there are no values associated with some of the vectors.

In one embodiment, the de-dimensional algorithm utilizes all of the input data associated with the individuals of the sample group to create the different user character classes. In this regard, the input data itself determines the classes in an unsupervised manner. In another embodiment, the user character classes may be predefined. In yet another embodiment, information related to desired user character classes may be input into the de-dimension algorithm prior to applying the de-dimensional algorithm to the input data such that the user character classes are generated in a supervised manner. As described in more detail below, the de-dimension algorithm may also be used to place a particular user in the appropriate user character class.

Figure 4:
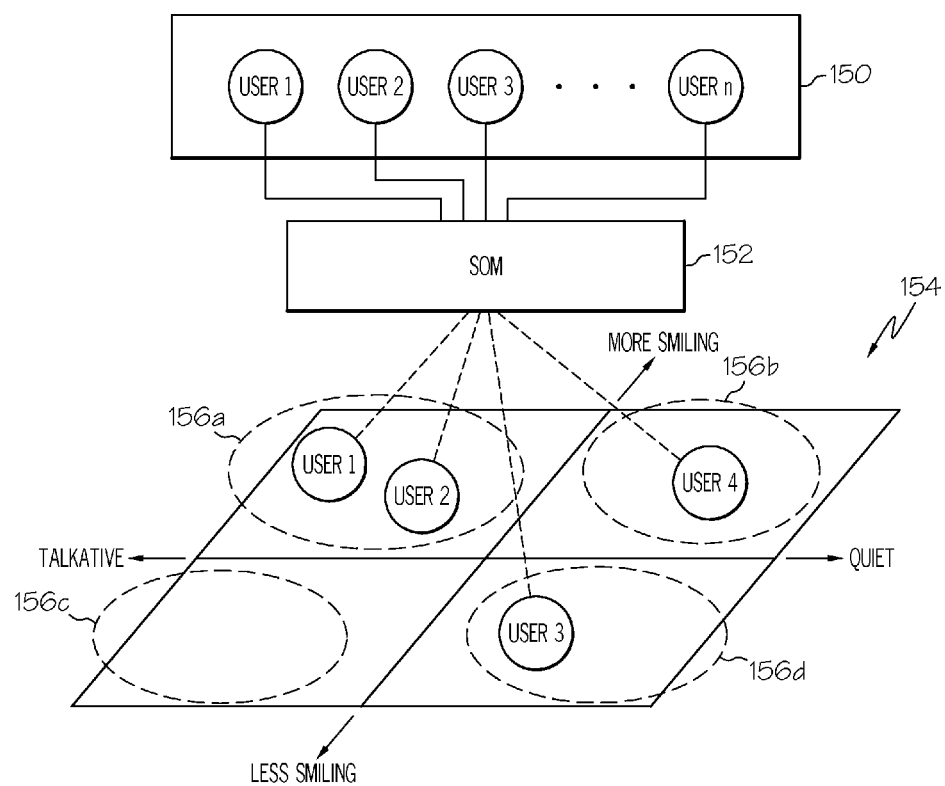
FIG. 4 depicts a schematic illustration of a de-dimensional algorithm according to one or more embodiments shown and described herein.

FIG. 4 illustrates a graphical representation of a SOM that is used to de-dimension the input data into fewer dimensional classes. Highly-dimensional input data is collected for a plurality of users that define the sample group, as illustrated in block 150. Each user has a plurality of user behavior vectors associated therewith. As an example and not a limitation, USER1 may be defined as User1(a_1, b_1, c_1, ... ), where a_1 is a value for the number of words spoken by the first user, b_1 is the amount of time user 1 smiled, etc. There may be any number of user behavior vectors and any number of users.

The highly-dimensional input data is then input into the de-dimensional algorithm which, in the illustrated example, is a SOM. Using the input data, the SOM creates a map 154 of the various user character classes and positions each user into an appropriate class. It should be understood that only four classes are illustrated for simplicity, and that any number of classes may be developed based on the input data that is received. For example, in one embodiment, eight user character classes may be developed. As shown in FIG. 4, each user character class is defined by particular personalities provided on a scale. A first character class 156a is defined by people who are talkative and tend to smile frequently, people in a second character class 156b tend to be relatively quite and smile frequently, people in a third character class 156c are talkative but do not smile often, and people in a fourth character class 156d are quiet and do not smile often.

The SOM or other de-dimensional algorithm(s) may generate many types of user character classes for a wide variety of personalities. For example, types of personalities may include, but are not limited to, Talkative/Quiet, Expressive/Reserved, Extrovert/Introvert, Positive/Negative, etc.

User preference data may be generated for each user that has experienced the introduction scenario. In one embodiment, the user preference data is in the form of one or more user preference vectors. The user preference vector contains the de-dimensioned data resulting from the de-dimensional algorithm and points to the particular user character class that is appropriate for the user. The user preference vector for each user may be stored in the database 120. As depicted in FIG. 4, each user may be assigned a particular user character class based on the information included in his or her user preference vector.

Referring once again to FIG. 3, after the user is classified into a selected user character class, a robot behavior may be generated by a robot behavior generator module that is illustrated as block 122. The robot behavior is the behavioral style that the robot will use to interact and communicate with the user. The robot behavior is determined by the robot behavior generator based at least in part on the user preference vector and the particular user character class that the user has been assigned. As an example and not a limitation, if a user is defined as a less-talkative personality compared with the rest of the population, the robot may attempt to talk more than usual based on the equilibrium theory of human-human communication, wherein people feel most comfortable when the communication is balanced.

The robot behavior generator module 122 may also consider the demographic parameter data of the user in conjunction with historical data of the particular user, as well as historical data of all users stored in the database when selecting the robot behavior. For example, an elderly person may normally be a talkative person but is too weak to speak as much as he or she desires. FIG. 3 shows an illustrative graph 126 of speaking patterns of individuals plotted against age. Other behavior vector data may be plotted against different demographic parameters using the historical data stored in the database. The robot behavior generator module 122 may, therefore, consider the age of the user, as well as other demographic parameter data such as medical condition, gender, etc. The robot behavior generator module 122 may utilize any stochastic process when analyzing the user preference vector and historical data stored in the database to select the appropriate robot behavior for each user. For example, a Bayesian network or fuzzy logic may be used to select or otherwise generate the appropriate robot behavior based on the user preference character, demographic parameter data and historical data of users.

In one embodiment, the robot behavior may be characterized by behavior parameters. As an example and not a limitation, such behavior parameters may include a listener parameter, a talker parameter, a speech speed parameter, and a volume parameter. The values assigned to each of these parameters may affect the manner in which the robot behaves when interacting with users. For example, a user of one particular user character class having certain demographic information may cause the robot behavior generator module 122 to generate a robot behavior in which the listener parameter is 0.21, the talker parameter is 0.79, the speech speed parameter is 0.7, and the volume parameter is 0.5. With this exemplary robot behavior, the robot will listen about 21% of the time and talk about 79% of the time during a human-robot interaction. It should be understood that embodiments are not limited to those values provided in the above example or the specific parameters listed above.

The output of the robot behavior generator module 122 is then input into a robot interaction performer module illustrated by block 124. The interaction performer module 124 determines the robot interaction scenario (i.e., script of the robot) that provides what the robot will talk about and the gestures that the robot will perform. The robot behavior affects the manner in which the script that the interaction performer provides is carried out. The script may be selected based on information gathered during the introduction scenario as well as historical data stored in the database. In one embodiment, the user may have indicated to the robot that he or she likes sports. Therefore, the interaction performer module 124 may issue instructions to the processor 130 such that the processor 130 instructs the robot to talk about sports with the user, or make particular gestures that are associated with sports. Additionally, the topics of conversation may be determined based on the user preference vector and historical data based on the population as a whole. As an example and not a limitation, the historical data may indicate that males between the ages of 18 and 30 like to discuss sports. Therefore, the robot may then attempt to discuss sports with the user. As another example, a person having a particular educational background and age may desire to talk about politics so the robot may then attempt to initiate a conversation about politics with the user. Any number of topics may be discussed. The user may also steer the conversation and indicate to the robot what topic he or she wishes to discuss.

As stated above, the robot behavior that is generated modifies the manner in which the script provided by the interaction performer module 124 is carried out by the robot. As an example, the interaction performer module 124 may provide that the robot should discuss the topic of raising children. The robot behavior provided by the robot behavior generator module 122 then adjusts the manner in which the topic is discussed (e.g., talking vs. listening, tone of voice, volume of voice, speed of voice, etc.).

Accordingly, each time the user has a subsequent user-robot interaction, the robot behaves in accordance with the generated robot behavior and interaction performer module script. The robot continues to receive input data from each user (block 112) during subsequent user-robot interaction sessions. This additional input data is then de-dimensioned and stored in the database as described above. Information related to the selected robot behaviors may also be fed back into the database for further use. In this manner, the user character classifications may continuously be developed and refined over time. In some instances, the user preference vector may indicate that a user should be classified in a different user character class. During the next user-robot interaction session, the robot may then change its behavior to a different robot behavior based on the new user character classification.

The input data collected by the robot may be stored in long-term user status log files that are associated with each of the users. In the medical context, the user status log files may be used as a barometer to diagnose an emotional health status. The long term log data may be useful for such diagnosis. As shown in FIG. 3, data that is stored within the database 120 may be transmitted to remote locations, devices and personnel via the communications module 128. For example, a user status log for a particular user may be transmitted to the user's caregiver for analysis.

In one embodiment, there are a plurality of robots that are deployed at many different locations. Each of the robots are communicatively coupled to a central database such that all of the robots may perform introduction scenarios, as well as subsequent user-robot interaction sessions. Input data collected from these sessions may then be transmitted to the central database to build a database that includes input data from many individual users. Robots may be deployed around different regions of a country, as well as different regions of the world. The input data from such a large population sample may improve the types of user character classifications and the ability for the robot to classify the user in the most appropriate user character class.

It should now be understood that the embodiments described herein assist to build successful relationships between humans and robots by enabling the robot to determine the personality of each of the users and behave accordingly. A plurality of user character classes may be developed based on the responses of users that interact with the robot during an introduction scenario. Each user may be classified into the user character class that most represents his or her personality type. The robot may then adjust its behavior to align with the personality of each user. Input data corresponding to the responses of each user during subsequent human-robot interactions may be collected to further refine the plurality of user character classes and reclassify users into different user character classes when appropriate. In this manner, users of the robot may enjoy interacting and building a relationship with the robot.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of generating a behavior of a robot comprising:
   measuring input data associated with a plurality of user responses, wherein the user responses correspond to an individual user of a user population;
   applying an algorithm to the input data of the plurality of user responses to generate a plurality of user character classes, wherein each user character class is associated with a personality type;
   storing the plurality of user character classes in a database;
   classifying the individual user into a selected one of the plurality of user character classes by generating user preference data, wherein the selected user character class and the user preference data are based at least in part on input data associated with the individual user;
   selecting a robot behavior based on the selected user character class; and
   controlling actions of the robot in accordance with the selected robot behavior during a user-robot interaction session.

2. The method of claim 1, wherein the plurality of user responses is retrieved from an introduction scenario, and the introduction scenario comprises:
   controlling the robot to ask the individual user a plurality of questions and/or perform at least one test conversation with the individual user;
   receiving demographic parameter data associated with the individual user;
   detecting movements of the individual user during the introduction scenario;
   detecting spoken words of the individual user during the introduction scenario; and
   detecting a tone of the spoken words during the introduction scenario.

3. The method of claim 2, wherein the introduction scenario further comprises detecting physiological data associated with the individual user during the introduction scenario.

4. The method of claim 1, wherein:
   the input data comprises a plurality of user behavior vectors; and
   the plurality of user behavior vectors are organized within the database according to demographic parameters.

5. The method of claim 4, wherein:
   the plurality of user behavior vectors comprise a number of words vector, a number of words per minute vector, a number of emotional words vector, a smiling time vector, a face movement vector, and a gesture vector; and
   the demographic parameters comprise an age parameter, a gender parameter, a cultural parameter, and a family situation parameter.

6. The method of claim 1, wherein the algorithm comprises a self-organizing map or a support vector machine that is operable to map the input data into the plurality of user character classes.

7. The method of claim 1, wherein the selected robot behavior is compatible with the personality type of the individual user.

8. The method of claim 1, wherein the robot behavior is selected by a stochastic process using the user preference data and input data of the plurality of user responses as inputs into the stochastic process.

9. The method of claim 8, wherein the stochastic process comprises a Bayesian network.

10. The method of claim 1 further comprising selecting a user interaction scenario based at least in part on the selected robot behavior, wherein the interaction scenario instructs the robot to discuss particular conversation topics and perform particular movements associated with the selected user character class.

11. The method of claim 1 further comprising:
    measuring input data associated with the plurality of user responses during one or more subsequent user-robot interaction sessions;
    applying the algorithm to the input data of a user response to the subsequent user-robot interaction sessions to update the plurality of user character classes, wherein the algorithm comprises a de-dimensional algorithm;
    storing the updated plurality of user character classes in the database;
    updating the user preference data with the measured input data after each subsequent user-robot interaction session;
    updating the selected user character class to a different user character class after each user-robot interaction if the user preference data indicates that the individual user should be classified into the different user character class;
    selecting a different robot behavior based on the different user character class; and
    controlling actions of the robot in accordance with the different robot behavior during the user-robot interaction session.

12. The method of claim 11, wherein the user preference data comprises a user preference vector, and the method further comprises:
    creating a user status log based on each calculated user preference vector, and each selected user character class, and each selected robot behavior over time;
    storing the user status log in the database; and
    transmitting the user status log to a remote location.

13. A method of generating a behavior of a robot comprising:

defining a plurality of user character classes, wherein the plurality of user character classes are stored in a database and each user character class is associated with a personality type;

measuring input data associated with a user response of a user to an introduction scenario performed by the robot;

applying a de-dimensional algorithm to the input data of the user response to generate a user character vector;

classifying an individual user into a selected one of the plurality of user character classes based at least in part on the user character vector and input data associated with the individual user;

selecting a robot behavior based on the selected user character class;

selecting a user interaction scenario based at least in part on the selected robot behavior, wherein the interaction scenario instructs the robot to discuss particular conversation topics and perform particular movements associated with the selected user character class;

controlling actions of the robot in accordance with the selected robot behavior and the user interaction scenario during one or more user-robot interaction sessions;

measuring input data associated with a user response to the one or more user-robot interaction sessions; and updating the user character vector, the selected user character class, the selected robot behavior, and the user interaction scenario after each user-robot interaction session based on the input data measured during the user-robot interaction sessions.

14. The method of claim 13, wherein the introduction scenario comprises:

controlling the robot to ask the user a plurality of questions and/or perform at least one test conversation with the user;

receiving demographic parameter data associated with the user;

detecting movements of the user during the introduction scenario;

detecting spoken words of the user during the introduction scenario; and detecting a tone of the spoken words during the introduction scenario.

15. The method of claim 13, wherein:

the input data comprises a plurality of user behavior vectors; and the plurality of user behavior vectors are organized within the database according to one or more demographic parameters.

16. The method of claim 15, wherein:

the plurality of user behavior vectors comprise a number of words vector, a number of words per minute vector, a number of emotional words vector, a smiling time vector, a face movement vector, and a gesture vector; and the one or more demographic parameters comprise an age parameter, a gender parameter, a cultural parameter, and a family situation parameter.

17. A robot comprising:

an audio output for producing sounds corresponding with human speech such that the robot is capable of speaking to a user of the robot;

an audio input for receiving speech of the user as the user interacts with the robot;

a video input for detecting movements of the user as the user interacts with the robot;

a processor for controlling actions of the robot;

one or more computer-readable memory devices comprising a database and a set of executable instructions capable of being read and executed by the processor, the executable instructions comprising:

a user character estimator module programmed to:

receive input data from the audio input and the video input, wherein the input data corresponds with the speech and movements of the user during an introduction scenario performed by the robot;

apply a de-dimensional algorithm to the input data of the user response to generate a user character vector;

classify the user into a selected one of a plurality of predefined user character classes based at least in part on the user character vector and input data associated with the user, wherein each user character class is associated with a personality type; and store the user character vector in the database;

a robot behavior generator module programmed to determine a robot behavior associated with the selected user character class; and an interaction performer module programmed to select a user interaction scenario based at least in part on the selected robot behavior, wherein the processor executes the set of executable instructions to control the robot to discuss particular conversation topics via the audio output and perform particular movements associated with the selected robot behavior, the selected user interaction scenario, and the selected user character class.

18. The robot of claim 17, wherein the introduction scenario comprises:

controlling the robot to ask the user a plurality of questions and/or perform at least one test conversation with the user;

receiving demographic parameter data associated with the user;

detecting movements of the user during the introduction scenario;

detecting spoken words of the user during the introduction scenario; and detecting a tone of the spoken words during the introduction scenario.

19. The robot of claim 17, wherein:

the input data comprises a plurality of user behavior vectors; and the plurality of user behavior vectors are organized within the database according to demographic parameters.

20. The robot of claim 17, wherein the plurality of predefined user character classes are determined by:

measuring input data associated with a plurality of user responses to the introduction scenario with the audio input, the video input, and the user character estimator module, wherein the user responses correspond to individual users of a user population; and applying the de-dimensional algorithm to the input data of the plurality of user responses to generate a plurality of user character classes with the user character estimator module.

* * * * *